Patented Apr. 7, 1925.

1,533,009

UNITED STATES PATENT OFFICE.

JULIUS KERSTEN, OF MANNHEIM, GERMANY.

TREATMENT OF ALKALI-METAL CHLORIDES.

No Drawing.   Application filed March 28, 1921.  Serial No. 456,192.

*To all whom it may concern:*

Be it known that I, Dr. JULIUS KERSTEN, a citizen of the Republic of Germany, residing at Mannheim, Germany, have invented certain new and useful Improvements in the Treatment of Alkali-Metal Chlorides, of which the following is a specification.

My invention refers to alkali-metal chlorides and more especially to the decomposition of such chlorides with a view to the production of hydrochloric acid. Its particular object is a method of treating alkali-metal chlorides with steam which leads to an almost perfect decomposition and to a copious formation of hydrochloric acid.

It is a well known fact that if alkali-metal chlorides are treated in a heated state with steam, the decomposition is carried only to a certain point and a thorough decomposition in this way is impossible. If the treatment is carried out in the presence of silica, the result obtained is not much more satisfactory and for this reason neither of these methods has been practised on a commercial scale. One is tempted to attribute their unfavorable results to the fact that if steam is conducted over a solid mass of hot alkali-metal chloride, it cannot penetrate into the interior so that generally speaking it comes in contact only with the surface of the mass. However if in consequence thereof by introducing steam into molten alkali-metal chloride a more intimate contact is established, the result instead of being superior, is even a far inferior one.

I have now ascertained by thorough experimental investigation that the last mentioned method can be improved to such an extent that it is not only operative on a commercial scale, but will even furnish an output exceeding 90 per cent, if the free alkali-metal formed by introducing steam into molten alkali-metal chloride is combined in statu nascendi with a suitable substance. By introducing steam into a molten mixture of alkali-metal chlorides and an alkali-metal silicate unsaturated as regards the alkali-metal, the alkali-metal chlorides are decomposed rapidly and thoroughly, an alkali-metal salt being formed which contains less acid than the one originally present. If for instance the meta silicate of potassium be employed, the ortho silicate will be obtained according to the equation $$2KCl + H_2O + K_2SiO_3 = 2HCl + K_4SiO_4.$$

In practising this method it is imperative to prevent the formation of free caustic alkali which in a molten state would destroy the lining, no matter of what composition, of every furnace.

The following experiment has proved the superior results of the novel method:

77 parts by weight of potassium meta silicate were mixed with 75 parts by weight of potassium chloride and the mixture was melted in a crucible. Steam was then introduced into the molten mass during one hour. If no decomposition had taken place, the molten product would have contained 23.43 per cent of chlorine, whereas in reality it contained no more than 2.36 per cent, which shows that about 90 per cent of the potassium chloride had been decomposed.

I claim :—

1. A method of decomposing alkali-metal chloride for obtaining hydrogen chloride (hydrochloric acid) with the aid of superheated steam, consisting in introducing steam into a molten mixture of alkali-metal chloride and alkali-metal silicate.

2. The method which consists in introducing steam into a molten mixture of an alkali-metal chloride and a meta-silicate.

3. The method which consists in introducing steam into a molten mixture of potassium chloride and potassium meta-silicate.

In testimony whereof I affix my signature.

Dr. JULIUS KERSTEN.